Patented Feb. 4, 1941

2,230,776

UNITED STATES PATENT OFFICE 2,230,776

PRINTING PLATE AND UNIT

Claus Heuck, Schkopau, and Adolf Freytag, Ludwigshafen-on-the-Rhine, Germany, assignors to I. G. Farbenindustrie Aktiengesellschaft, Frankfort-on-the-Main, Germany No Drawing. Application May 13, 1939, Serial No. 273,550. In Germany May 16, 1938

3 Claims. (Cl. 101—395)

The present invention relates to printing plates and printing units.

It has already been proposed to replace the type metal hitherto used for printing units, especially printing types, and also printing plates, by organic substances, as for example phenol-aldehyde resins or polystyrene. These substances have, however, not fulfilled the high requirements placed on them during use. To serve as a material for printing units the substances must not be too brittle, since otherwise stresses, which occur during the preparation or use of the printing units and plates may give rise to their destruction, but on the other hand the hardness of the substances must be so great that all the details of a picture, ornamentation or script are accurately reproduced. Even after the greatest possible number of prints, the units and plates must be unchanged even in all the details. Since the printing units become dirty in use, they must frequently be cleaned with solvents. Benzine and motor fuel compositions, as for example mixture of preponderating amounts of benzine with benzene and alcohol have proved especially suitable for this purpose. The printing units must naturally be insoluble in these solvents and must not even swell on contact therewith since otherwise the reproduction is not exact in all the details. Moreover, for a useful employment of the printing units and plates, it is necessary that after use they may be recast to new units as frequently as possible without being adversely changed. Phenol-aldehyde resins cannot be recast because in the hardened state they are no longer fusible. Polystyrene has proved to be too brittle for the production of printing units. Moreover, it is not sufficiently stable to benzines.

We have now found that interpolymerization products of styrene with acrylic nitrile or methacrylic nitrile can be used with advantage for the preparation of printing units and plates. Interpolymerization products which have been prepared by polymerization in aqueous emulsion are especially suitable. The substances thus obtained are distinguished by good hardness, great toughness, complete insolubility in benzine and good stability to motor fuel compositions, as for example mixtures of preponderating amounts of benzine with benzene and alcohol. Sufficient resistance to benzine is obtained even by interpolymerizing 2 per cent of acrylic or methacrylic nitrile with styrene (calculated with regard to the mixture), whereas for producing resistance also to the aforesaid motor fuel compositions larger amounts of acrylic nitrile are usually necessary, as for example from 30 to 50 per cent. The stability to motor fuels may be increased by interpolymerizing styrene and acrylic or methacrylic nitrile with minor amounts, e. g. up to 25 per cent of the whole mixture, of methacrylic acid methyl ester and/or polymerizable compounds having a plurality of reactive unsaturated carbon linkages, such as butadiene, divinylbenzene or also diethylene glycol divinyl ether, and also vinyl esters of unsaturated acids, such as crotonic acid vinyl ester.

The said interpolymerization products may also contain small amounts of other vinyl compounds. Thus interpolymerization products of styrene, acrylic nitrile and vinylcarbazole are distinguished by greater hardness and a higher softening point than corresponding polymerization products produced without the addition of vinylcarbazole.

The interpolymerization products obtained may be used alone or mixed with dyestuffs or fillers. The dyestuffs and fillers may be added during the preparation of the substances, for example to the emulsions of the monomers or polymers when polymerizing in aqueous emulsion or to the monomers when polymerizing in a block.

The said polymerization products may be used with special advantage to replace the type metal hitherto used. In particular they facilitate handling by reason of their lower specific gravity as compared with type metal. The substances may be repeatedly recast and used again for fresh printing units and plates.

What we claim is:

1. Printing plates and printing units comprising interpolymerization products of styrene with a nitrile selected from the group consisting of acrylic and methacyrlic nitrile.

2. Printing plates and printing units comprising interpolymerization products of styrene with a nitrile selected from the group consisting of acrylic and methacrylic nitrile, and methacrylic acid methyl ester.

3. Printing plates and printing units comprising interpolymerization products of styrene with a nitrile selected from the group consisting of acrylic and methacrylic nitrile, and a further compound having a plurality of reactive unsaturated carbon linkages.

CLAUS HEUCK.
ADOLF FREYTAG.